United States Patent [19]

Friton

[11] Patent Number: 4,635,981
[45] Date of Patent: Jan. 13, 1987

[54] IMPACT ATTENUATING BODY

[75] Inventor: Warren D. Friton, Union City, Calif.

[73] Assignee: Energy Absorption Systems, Inc., Chicago, Ill.

[21] Appl. No.: 665,721

[22] Filed: Oct. 29, 1984

[51] Int. Cl.$^4$ .......................................... B60R 19/02
[52] U.S. Cl. ...................... 293/1; 293/110; 293/133; 256/13.1; 188/377; 267/140.4
[58] Field of Search .............. 293/1, 102, 109, 110, 293/133; 296/189; 188/377, 378; 267/116, 139, 140, 140.3, 140.4, 152, 153; 213/220-221; 104/249, 254; 256/13.1; 404/6, 9, 10

[56] References Cited

U.S. PATENT DOCUMENTS

| | | | |
|---|---|---|---|
| 3,058,738 | 10/1962 | Corson et al. | 267/140 |
| 3,608,883 | 9/1971 | Russold | 267/152 |
| 3,693,940 | 9/1972 | Kendall et al. | 256/13.1 X |
| 3,721,433 | 3/1973 | Sobel | 267/140 |
| 3,845,936 | 11/1974 | Boedecker, Jr. et al. | 256/13.1 |
| 3,888,531 | 6/1975 | Straza et al. | 293/1 |
| 3,907,353 | 9/1975 | Dinitz | 293/102 |
| 3,944,187 | 3/1976 | Walker | 256/13.1 |
| 3,982,734 | 9/1976 | Walker | 256/13.1 |
| 4,008,915 | 2/1977 | Walker | 213/220 X |
| 4,029,350 | 6/1977 | Goupy et al. | 293/110 |
| 4,072,334 | 2/1978 | Seegmiller et al. | 293/110 |
| 4,118,014 | 10/1978 | Frosch et al. | 256/13.1 X |
| 4,154,469 | 5/1979 | Goupy et al. | 293/120 |
| 4,227,593 | 10/1980 | Bricmont et al. | 293/133 |
| 4,352,484 | 10/1982 | Gertz et al. | 104/254 X |
| 4,399,980 | 8/1983 | van Schie | 188/377 X |
| 4,413,856 | 11/1983 | McMahan et al. | 296/188 |
| 4,452,431 | 1/1984 | Stephens et al. | 256/13.1 |

FOREIGN PATENT DOCUMENTS 2755888 6/1979 Fed. Rep. of Germany ...... 293/102

Primary Examiner—Robert B. Reeves
Assistant Examiner—Russell D. Stormer
Attorney, Agent, or Firm—Willian Brinks Olds Hofer Gilson & Lione Ltd.

[57] ABSTRACT

An impact attenuating body is disclosed for use on trucks or the like, the impact attenuating body being arranged for engagement by vehicles or the like, the impact attenuating body being further adapted for gradually arresting motion of the vehicle and dissipating its impact energy. The impact attenuating body is formed with a collapsible form including laterally extending members with interconnecting brackets forming rows of compartments, the compartments being generally elongated along the direction of travel of the vehicle, selected compartments being void and different densities of shock absorbing material such as expanded plastic foam being arranged in the other compartments for arresting movement of the vehicle and dissipating its impact energy as the vehicle travels a selected distance after initial engagement with the body, the arrangement of shock absorbing material in the compartments being selected for causing the vehicle to continue generally along its initial travel direction.

35 Claims, 6 Drawing Figures

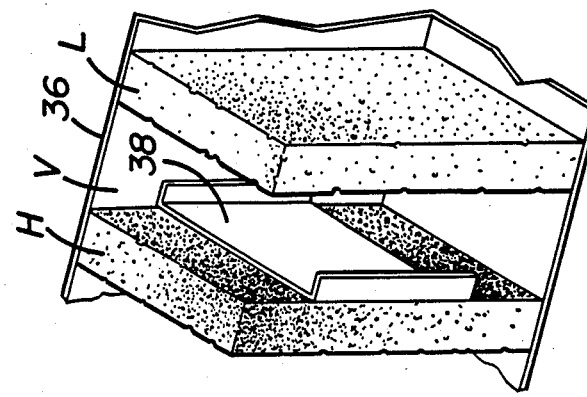
FIGURE 6
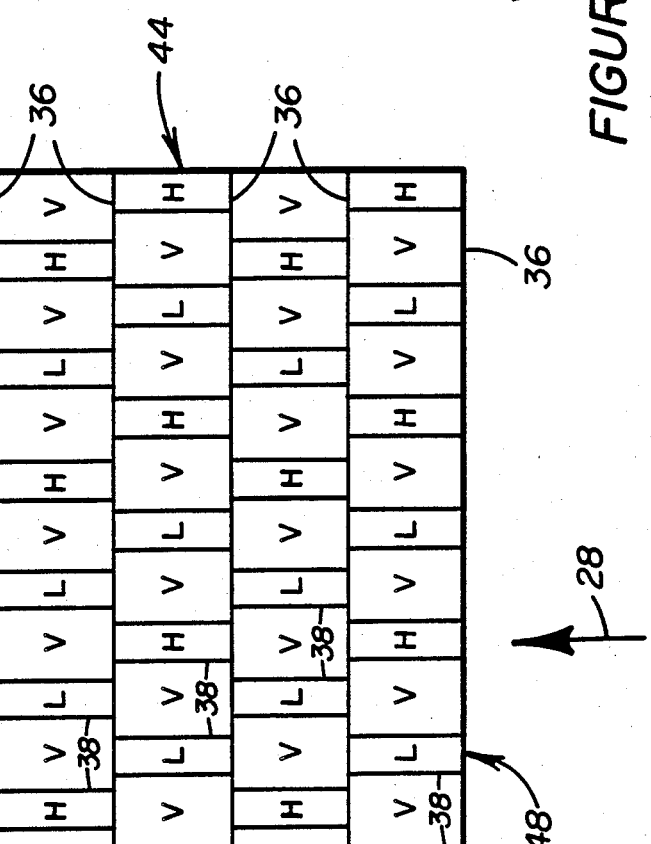
FIGURE 5
FIGURE 4

IMPACT ATTENUATING BODY

BACKGROUND OF THE INVENTION

The present invention relates to impact attenuating bodies and more particularly to such impact attenuating bodies employed in applications contemplated for engagement by vehicles or other objects moving in a generally predetermined travel direction.

Impact attenuating bodies of the type referred to above have commonly been employed in the prior art in a number of different applications. For example, they are commonly employed in connection with maintenance and surveillance vehicles used, for example, in transit areas such as highways, freeways and bridges. In such situations, even though the vehicles are highly visible and are provided with extra warning lights or other devices, they are commonly subject to collision or impact by overtaking vehicles.

Customary protective devices such as bumpers and the like do not provide sufficient protection for the maintenance vehicles in such situations. At the same time, the overtaking vehicles may also be subject to substantial damage. Impact attenuating bodies have been developed for use in such maintenance vehicles in order to provide greater protection for the vehicles and their occupants during collisions.

Generally impact attenuating bodies are elongated and are mounted, for example, on the rear of the maintenance vehicles so that an overtaking vehicle impacts the body instead of the truck. Shock absorbing material within the body not only protects the truck and its occupants during the collison but also tends to provide protection for occupants of the overtaking vehicle. In particular, it is desirable for such impact attenuating bodies to be able to gradually arrest movement of the vehicle over a selected distance of travel, for example, along one dimension of the impact body. After initial engagement of the overtaking vehicle with the body and during the selected distance of travel thereafter, the impact attenuating body is designed to dissipate the impact energy of the vehicle.

A number of such impact attenuating bodies have been provided in the prior art as indicated, for example, in U.S. Pat. No. 3,907,353 issued Sept. 23, 1975 to Dinitz and U.S. Pat. No. 4,008,915 issued Feb. 22, 1977 to Walker. These references are typical of prior art impact attenuating bodies in that they employ a plurality of similarly formed and oriented elements or cells filled with shock absorbing material in order to accomplish the purposes referred to above.

However, because of the generally substantial impact forces developed during such collisions, there has been found to remain an increasing demand for even more effective impact attenuating bodies.

SUMMARY OF THE INVENTION

It is therefore an object of the invention to provide an impact attenuating body exhibiting substantial improvements over prior art devices such as those described above.

It is a further object of the invention to provide such an impact attenuating body adapted for mounting on a truck or the like for engagement by vehicles or other objects moving in generally a predetermined direction of travel, construction of the impact attenuating body being selected for dissipating impact energy of the vehicle as it travels a selected distance after initial engagement with the body.

It is an even further and related object of the invention to provide such an impact attenuating body which is further designed for causing the vehicle or object to continue along substantially the same travel direction after its initial engagement with the body and while the vehicle's impact energy is being dissipated by the body.

Yet another related object of the invention is to provide such an impact attenuating body including a novel collapsible frame assembly forming a plurality of compartments which comprise the impact attenuating body.

In a preferred construction of the present invention, an impact attenuating body is formed with multiple rows of vertically arranged compartments, with selected compartments spaced laterally apart from each other in transverse relation to the travel direction being generally void, intermediate compartments between the void compartments containing shock absorbing material selected for arresting movement of vehicles or other objects impacting the body.

More preferably, the above impact attenuating body is formed with each void compartment and more preferably all of said compartments having a cross-sectional dimension parallel with the travel direction substantially greater than its width extending transverse to the travel direction. This configuration of the compartments, particularly the void compartments, serves in particular to assure that the vehicle or body continues to travel along the same travel direction after initial engagement with the body.

Additional objects and advantages of the present invention are made apparent in the following description having reference to the accompanying drawings.

BRIEF DESCRIPTION OF THE DRAWINGS

In the drawings:

FIG. 1 is a side view in elevation of an impact attenuating body constructed according to the present invention mounted on the back of a maintenance truck or the like.

FIG. 4 is a schematic illustration of preferred configurations for compartments within the impact attenuating body and a preferred arrangement of different shock absorbing densities for said compartments.

FIG. 5 is a fragmentary perspective view of a single void compartment within the impact attenuating body and compartments of different density shock absorbing materials on opposite sides thereof.

FIG. 6 is an enlarged fragmentary view of one of a large number of brackets interconnected between laterally extending members for forming the compartments in the impact attenuating body.

DESCRIPTION OF THE PREFERRED EMBODIMENT

Figure 1:
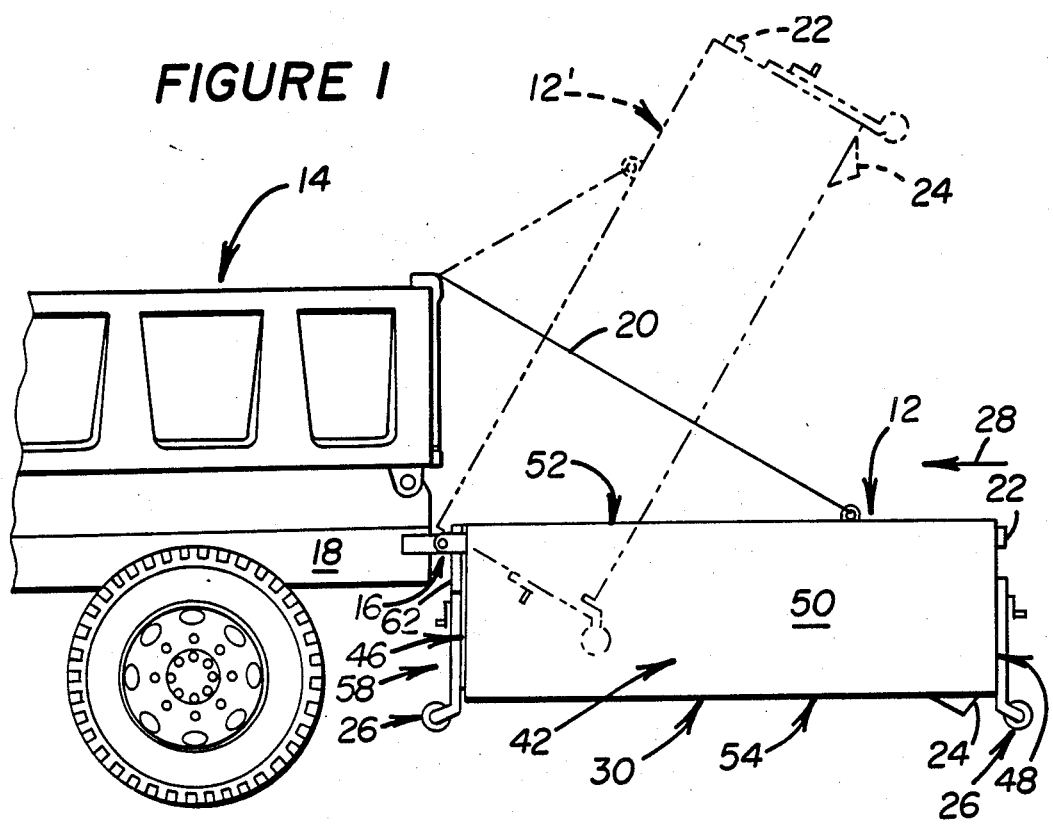
Figure 2:
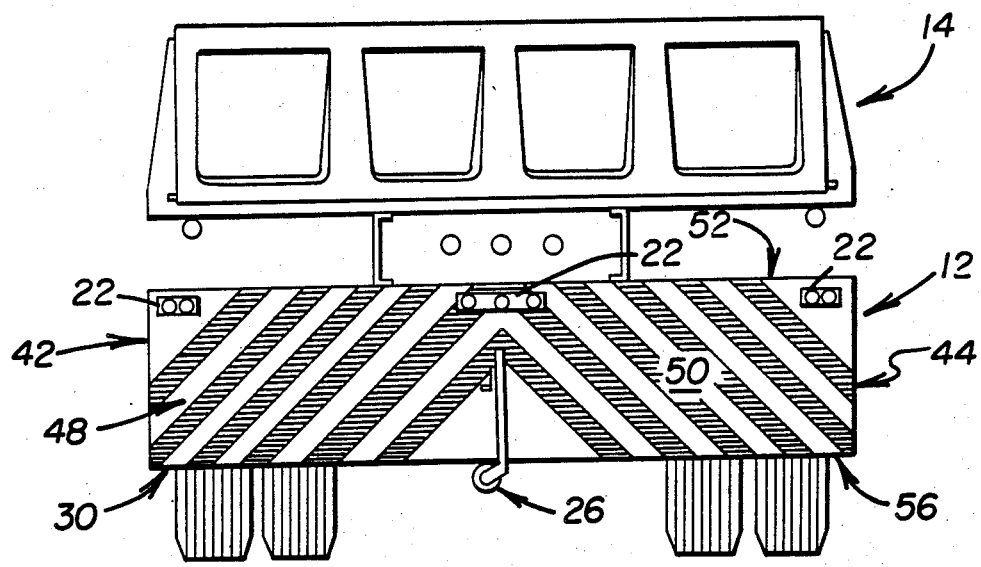
FIG. 2 is a rear view of FIG. 1.

Referring now to the drawings and particularly to FIGS. 1 and 2, an impact attenuating body of the type contemplated by the present invention is generally indicated at 12 for use with a maintenance truck or the like generally indicated at 14.

Since most collisions of the type contemplated by the present invention involve vehicles or objects approaching the maintenance truck 14 from the rear, the impact attenuating body 12 is preferably mounted to extend rearwardly from the truck so that it will first be engaged by an overtaking vehicle.

As illustrated in FIGS. 1 and 2, the impact attenuating body 12 may be connected by hinges as indicated at 16 to structural elements 18 of the truck 14. The impact attenuating body 12 may be further interconnected with the truck, for example by means of lines or cables 20. The cables 20 may further comprise adjusting means (not shown) for raising the impact attenuating body as generally indicated in phantom at 12'. The impact attenuating body may be raised into the position 12' for example when the truck 14 is moving between different sites and is not subject to collision for overtaking vehicles as contemplated by the present invention.

The impact attenuating body 12 may be provided with lights or signals means 22 and 24 visible when the impact attenuating body is in either its operating position shown in solid lines in FIG. 1 or in the transport position illustrated at 12'. Similarly, the impact attenuating body may be provided with adjustable rollers 26 or the like to facilitate handling and movement of the impact attenuating body when it is not mounted upon the truck 14. However, these components are not particularly contemplated as being within the scope of the present invention.

Continuing with momentary reference to FIG. 1, the impact attenuating body 12 is particularly contemplated for providing protection to the truck 14 and also to an overtaking vehicle or other object commonly anticipated to travel along a direction generally indicated at 28. The manner in which the impact attenuating body 12 accomplishes this object of the invention is described in greater detail below with reference to FIGS. 3-6.

Figure 3:
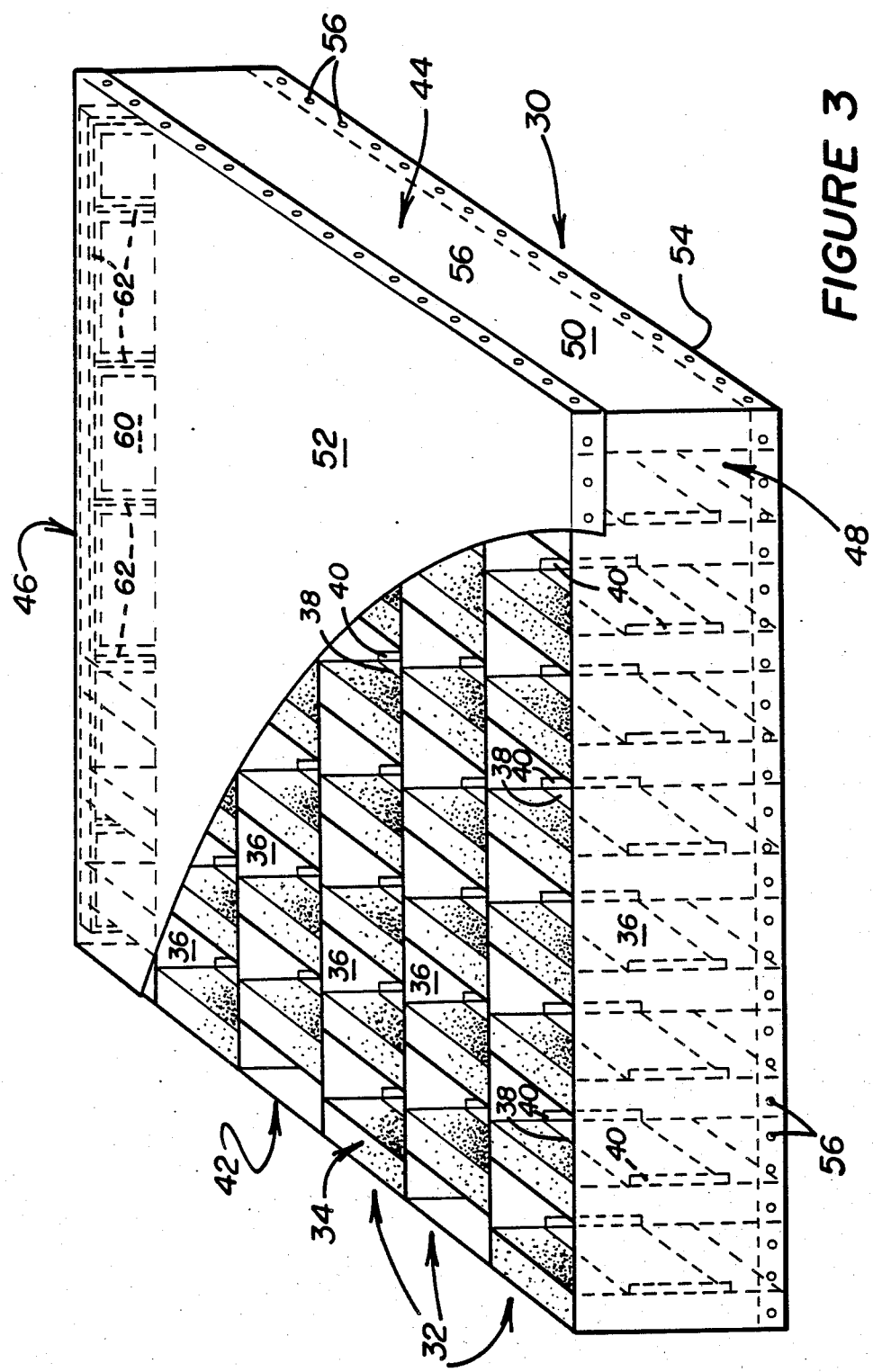
FIG. 3 is a perspective view with portions being broken away, of a collapsible frame assembly for an impact attenuating body according to the present invention.

Referring to FIGS. 3 and 4, the impact attenuating body 12 is formed with a collapsible frame assembly 30 forming multiple lateral rows 32 of compartments 34. The compartments 34 contain different effective densities of shock absorbing material for purposes described in greater detail below. Referring particularly to FIG. 4 a large number of the compartments generally indicate a V are void. Of the remaining compartments, a portion of the indicated at H are filled with relatively high density shock absorbing material. The remaining compartments indicated at L are filled with relatively low desity shock absorbing material. The corresponding effective shock absorbing values for the compartments V, H and L are generally proportional to their densities.

Note that the direction of travel contemplated for a vehicle or object impacting the body 12 is also indicated at 28 in FIG. 4. Referring in combination to FIGS. 3 and 4, all of the compartments, particularly to void compartments V, are formed with a cross-sectional dimension parallel to the travel direction 28 substantially greater than their laterally extending dimension.

In a typical configuration disclosed here only for purposes of example, the impact attenuating body 12 may be formed with each of the compartments V, H and L having a vertical length of about two feet. The elongated dimension of each compartment parallel to the travel direction 28 is about one foot. The width of the void compartments may be in the range of 7 to 8 inches while the lateral dimension of both the high density and low density compartments H and L is about 4 inches. Referring particularly to FIG. 4, it may be seen that different numbers of compartments are formed in alternating lateral rows 32A and 32B. This difference in the numbers of compartments is compensated for by adjusting the lateral dimensions of the void compartments V.

One of the void compartments V is also illustrated in FIG. 5 with a high density compartment H on its left side and a low density compartment on its right side. Preferably, the high density compartments contain expanded rigid plastic foam having an effective shock absorbing density for example of about 2.5 pounds per cubic foot. The low density compartments L similarly contain expanded rigid plastic foam having a density for example of 1.7 pounds per cubic foot. Here again, these values are set forth by way of illustration and are not intended to be limiting in connection with the present invention.

Before describing the collapsible frame assembly 30, it is further noted with particular reference to FIG. 4 that each of the lateral rows 32A and 32B contains an arrangement of compartments selected for improving operation of the impact attenuating body. Initially, the void compartments V are alternated with high density and low density compartments H and L to form a checkerboard-type pattern.

The arrangement of high density and low density compartments H and L is selected for providing a predetermined overall shock absorbing value for the entire body 12 capable of arresting movement of vehicles or objects traveling along the direction 28. Motion of the vehicle traveling within the national speed limit is preferably arrested after traveling a distance generally corresponding to a little less than the longitudinal domension of the impact attenuating body parallel to the travel direction 28. In this manner, impact forces within the overtaking vehicle are minimized while assuring protection for the truck 14 (see FIGS. 1 and 2)

The alternating arrangement of the void compartments V in each of the lateral rows 32 and along the longitudinal dimension of the body 12 serve to better assure that the vehicle or other object will continue traveling in substantially the same direction as indicated at 28 after initial impact with the body 12. This object is accomplished because of the elongated configurations and arrangement of the compartments, particularly the void compartments V as best seen in FIG. 4.

Continuing with reference to FIG. 4, it may be seen that, because of the offset arrangement of lateral rows 32 and the different numbers of compartments formed in each row, an increased number of low density compartments L is formed generally through a longitudinally central portion of the body parallel with the travel direction 28.

In alternating rows 32A, the arrangement of compartments between the void compartments V alternates between a high density compartment H and a low density compartment L. However, in the alternate lateral rows 32B, each centrally arranged void compartment V sub C has low density compartments L on each side thereof. This arrangement of low density compartments through the center of the body further serves to assure the continued travel of an overtaking vehicle or other body along the same direction of travel 28 after it comes into impacting engagement with the body 12.

Referring particularly to FIG. 3, the collapsible frame assembly 30 is formed by a plurality of laterally extending members 36 extending transversely across the attenuating body 12. The lateral members 36 have a vertical dimension generally the same as the vertical lengths of the compartments 34. Brackets 38 are interconnected in spaced apart relation between the lateral members 36 in order to form the compartments 34 as are also illustrated in FIG. 4. The brackets 38 preferably have a vertical dimension about half that of the lateral members 36. Referring particularly to FIG. 6, the longitudinal ends of the brackets 38 are formed with flanges 40 to facilitate their attachment to the members 36. With the lateral members 36 and the brackets 38 being formed from metal of sheet steel, the brackets are preferably interconnected between the lateral members by spot welding of the flanges 40 to the lateral members.

Continuing with reference to FIG. 3, a shell encompassing the lateral sides 42 and 44 as well as the longitudinal ends 46 and 48 is preferably formed by a single or integral sheet 50 of metal or the like. Preferably, opposite ends of the sheet 50 are substantially overlapped along the forward longitudinal end 46. Top and bottom flexible panels 52 and 54 are also formed from relatively thin sheet steel for example, and are interconnected with the sheet 50 for example by rivets 56 in order to entirely close the impact attenuating body 12.

In order to facilitate the attachment of the impact attenuating body 12 to a vehicle such as the truck 14 of FIGS. 1 and 2, a mounting assembly is arranged on the forward longitudinal end 46. The mounting assembly is generally indicated at 58 and includes an additional sheet formed for example from plywood as indicated at 60 (FIG. 3) spanning the forward longitudinal end 46 of the impact attenuating body. Framed angle iron is attached to the sheet 50 and the plywood panel 60 at the forward longitudinal end of the body 12. The framed angle iron is generally indicated at 62 and provides a means for attachment to the hinges 16 (see FIGS. 1 and 2).

For purposes of illustration and not to limit the scope of the present invention, various components of the collapsible frame assembly 30, in addition to those specified above, are formed from galvanized sheet steel or the like. For example, the shell or outer sheet 50 is formed from 18 gauge galvanized sheet steel. The cell dividers or lateral members 36 are formed from 20 gauge galvanized sheet steel while the brackets 38 are formed from 22 gauge galvanized sheet steel. In the mounting assembly 58, the framing angle iron has a thickness of ⅛ inch and a width along its angled sides of 1½ inch. The plywood panel 60 is ⅝ inch thick with the top and bottom panels 52 and 54 being formed from aluminum sheet having a thickness for example of 40 mils.

There has thus been described an embodiment of an impact attenuating body for providing improved protection for maintenance trucks and other vehicles as well as being useful in other related applications. Various modifications and additions will be apparent in addition to those specifically set forth above. Accordingly, the scope of the present invention is defined only by the following appended claims.

What is claimed is:

1. An impact attenuating body adapted to be engaged by vehicles or other objects moving in generally a selected direction of travel, the impact attenuating body being further adapted for gradually arresting motion of the moving object and dissipating its impact energy, comprising
frame means comprising a plurality of laterally extending, spaced members and forming multiple rows of vertically arranged cells therebetween, said rows of cells being formed in transverse relation to the travel direction, said cells in each row providing differing effective degrees of shock absorption, including first cells having a higher effective degree of shock absorption and second cells having a lower effective degree of shock absorption whereby movement of the object is arrested as it travels a selected distance after initial engagement with the body, said arrangement and cross-sectional shape of said cells selected such that selected ones of the first cells are situated in front of respective selected ones of the second cells in the travel direction.

2. The impact attenuating body of claim 1 wherein said cells are each formed with a relatively elongated cross-sectional shape parallel with the travel direction.

3. The impact attenuating body of claim 1 wherein the second cells have and effective selected density of zero and the first cells have an effective density of a shock absorbing material.

4. The impact attenuating body of claim 3 wherein said zero density cells are void.

5. The impact attenuating body of claim 4 wherein said first cells contain shock absorbing material comprising expanded plastic foam.

6. The impact attenuating body of claim 5 wherein said expanded foam is formed with different densities and different corresponding shock absorbing values in various ones of said second portion of said first cells.

7. The impact attenuating body of claim 6 wherein said cells are each formed with a relatively elongated cross-sectional dimension parallel with the travel direction.

8. The impact attenuating body of claim 7 wherein an arrangement of different effective shock absorbing densities in said cells is selected to arrest movement of the object and dissipate its impact energy as the object travels a selected distance after initial engagement with the body, said void cells further being arranged in a pattern selected for causing the object to continue along the same travel direction after its initial engagement with the body and while the object's impact energy is being dissipated by the body.

9. The impact attenuating body of claim 1 wherein a relatively increased number of said second cells is arranged along the longitudinal center of the body for causing the object to continue along its initial travel direction.

10. The impact attenuating body of claim 1 wherein each of the selected second cells is situated laterally between a pair of flanking first cells, and wherein the flanking first cells are characterized by differing degrees of shock absorption such that the selected first cells are assymetrically supported with respect to impacts in the travel direction.

11. The impact attenuating body of claim 1 wherein the frame means comprises means for mounting the frame means to an automotive vehicle.

12. The impact attenuating body of claim 1 further comprising elongated brackets interconnected between said laterally extending members for forming said cells.

13. The impact attenuating body of claim 1 further comprising an outer shell formed from an integral sheet spanning the lateral and end surfaces of the impact attenuating body.

14. The impact attenuating body of claim 13 further comprising top and bottom flexible panels interconnected with said outer shell for enclosing the impact attenuating body.

15. The impact attenuating body of claim 1 further comprising an outer shell formed from an integral sheet spanning the lateral and end surfaces of the impact attenuating body.

16. The impact attenuating body of claim 15 further comprising top and bottom flexible panels interconnected with said outer shell for enclosing the impact attenuating body.

17. An impact attenuating body arranged for engagement by vehicles or other objects moving in a generally selected direction of travel, the impact attenuating body being adapted for gradually arresting motion of the object and dissipating its impact energy, comprising
collapsible frame means comprising a plurality of spaced members forming multiple rows of vertically arranged compartments therebetween, selected compartments being spaced laterally apart from each other in transverse relation to the travel direction and being generally void, each said void compartment having a length parallel with the travel direction substantially greater than its width extending transverse to the travel direction, intermediate compartments between said void compartments containing shock absorbing materials selected to arrest movement of the object and dissipate its impact energy as the object travels a selected distance after initial engagement with the body, said void compartments being arranged in a pattern such that selected ones of the intermediate compartments are situated in front of respective selected ones of the void compartments in the selected direction of travel and selected intermediate compartments are supported by the respective member.

18. The impact attenuating body of claim 17 wherein said intermediate compartments contain shock absorbing material comprising expanded plastic foam.

19. The impact attenuating body of claim 18 wherein said expanded material is formed with different densities and different corresponding shock absorbing values in said intermediate compartments.

20. The impact attenuating body of claim 17 wherein said frame means comprises a plurality of elongated brackets interconnected between said members for forming said compartments.

21. The impact attenuating body of claim 20 further comprising an outer shell formed from an integral sheet spanning the lateral and end surfaces of the impact attenuating body, top and bottom flexible panels being interconnected with said outer shell for enclosing the impact attenuating body.

22. The impact attenuating body of claim 17 wherein each of the selected void compartments is situated laterally between a pair of flanking intermediate compartments, and wherein the flanking intermediate compartments are characterized by differing shock absorbing values such that the selected intermediate compartments are assymetrically supported with respect to impacts in the selected direction of travel.

23. The impact attenuating body of claim 17 wherein the frame means comprises means for mounting the frame means to an automotive vehicle.

24. An impact attenuating body arranged for engagement by vehicles or other objects moving in generally a selected direction of travel, the impact attenuating body being adapted for gradually arresting motion of the object and dissipating its impact energy, comprising
collapsible frame means comprising a plurality of spaced members forming multiple rows of vertically arranged compartments therebetween, said rows of compartments being formed in transverse relation to the travel direction, said compartments each having a relatively elongated cross-sectional dimension parallel with the travel direction, said compartments in each row comprising a plurality of first compartments characterized by a higher degree of shock absorption and a plurality of second compartments characterized by a lower degree of shock absorption whereby movement of the vehicle is arrested as the vehicle travels a selected distance after initial engagement with the body, said arrangement and cross-sectional shape of said compartments selected such that selected ones of the first compartments are situated in front of respective selected ones of the second compartments in the travel direction.

25. The impact attenuating body of claim 24 wherein said second compartments are void and said first compartments contain shock absorbing material comprising expanded plastic foam.

26. The impact attenuating body of claim 25 wherein said expanded material is formed with different densities and different corresponding shock absorbing values in said first compartments.

27. The impact attenuating body of claim 26 further comprising an outer shell formed from an integral sheet spanning the lateral and end surfaces of the impact attenuating body, top and bottom flexible panels being interconnected with said outer shell for enclosing the impact attenuating body.

28. The impact attenuating body of claim 24 wherein each of the selected second compartments is situated laterally between a pair of flanking first compartments, and wherein the flanking intermediate compartments are characterized by differing shock absorbing values such that the selected first compartments are assymetrically supported with respect to impacts in the travel direction.

29. The impact attenuating body of claim 24 wherein the frame means comprises means for mounting the frame means to an automotive vehicle.

30. An impact attenuating body arranged for engagement by vehicles moving generally in a selected direction of travel in order gradually to arrest motion of the vehicle and to dissipate kinetic energy of the vehicle, said impact attenuating body comprising:
a frame comprising a plurality of spaced, parallel members extending transverse to the travel direction;
a plurality of spaced, parallel brackets extending parallel to the travel direction, each bracket secured between two adjacent members, said brackets and members arranged in multiple rows to define an array of first and second cells arranged in a checkerboard-type pattern;
each of said first cells characterized by a higher degree of shock absorption and each of said second cells characterized by a lower degree of shock absorption;
an outer shell surrounding the members; and
means for mounting the shell to an automotive vehicle.

31. The impacting attenuating body of claim 30 wherein the members, brackets, and shell are formed of sheet metal.

32. The impact attenuating body of claim 30 wherein the first cells contain a shock absorbing material and the second cells are void.

33. The impact attenuating body of claim 30 wherein the first cells in each row transverse to the travel direction alternate in degree of shock absorption.

34. The impact attenuating body of claim 33 wherein said cells are each formed with a relatively elongated cross-sectional dimension parallel with the travel direction.

35. The impact attenuating body of claim 30 wherein the first cells are narrower transverse to the travel direction and the second cells.

* * * * *

UNITED STATES PATENT AND TRADEMARK OFFICE
CERTIFICATE OF CORRECTION

PATENT NO. : 4,635,981

DATED : Jan. 13, 1987

INVENTOR(S) : Warren D. Friton

It is certified that error appears in the above-identified patent and that said Letters Patent is hereby corrected as shown below:

IN THE CLAIMS

In Claim 3 (column 6, line 18), please delete "and" and substitute therefor --an--;

In Claim 17 (column 7, line 34), please delete "and selected" and substitute therefor --and the selected--;

In Claim 35 (column 10, line 10), please delete "and" and substitute therefor --than--.

Signed and Sealed this

Twenty-fourth Day of May, 1988

*Attest:*

DONALD J. QUIGG

*Attesting Officer*  *Commissioner of Patents and Trademarks*